Figure 1:
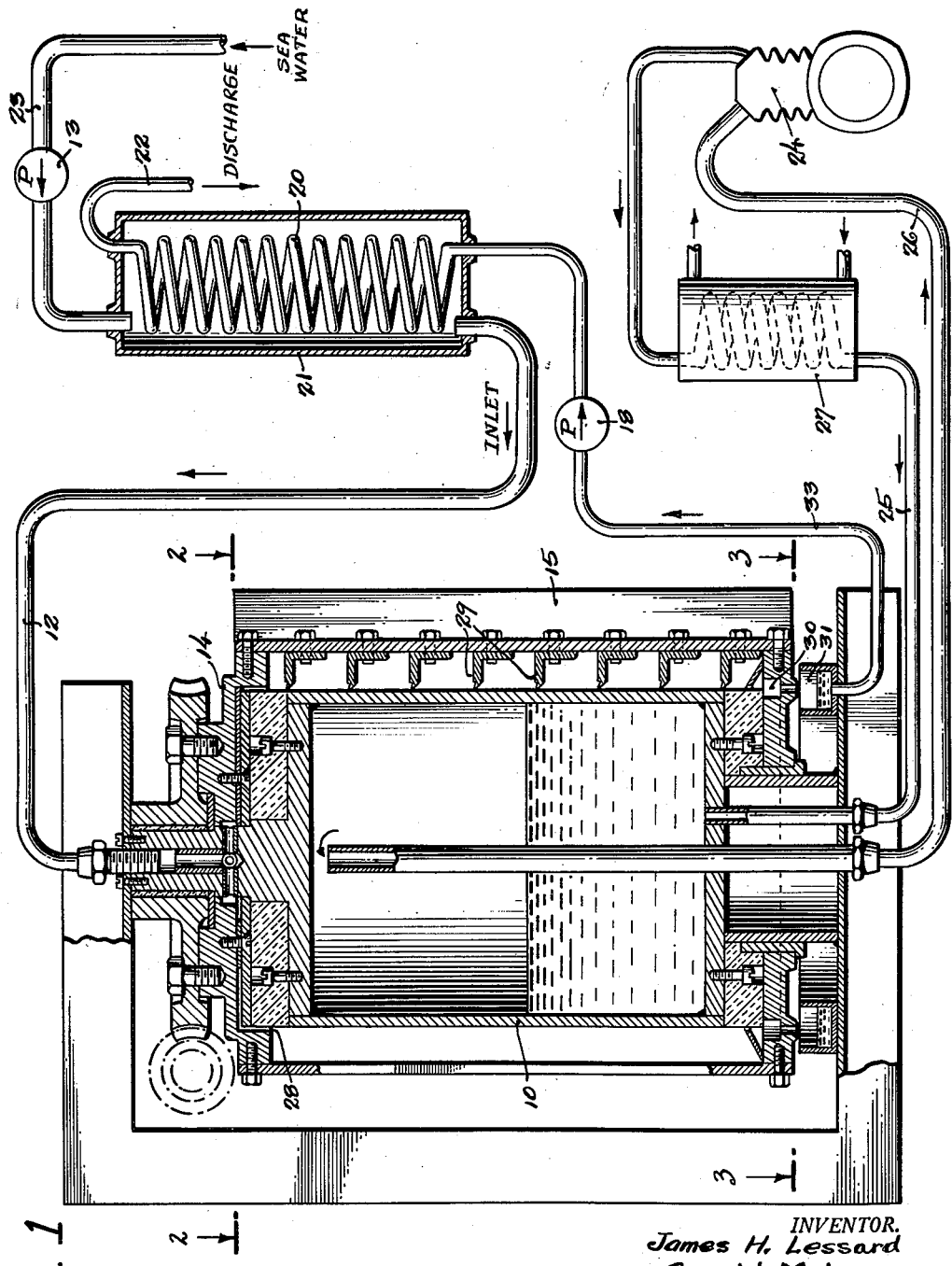

Feb. 12, 1952 J. H. LESSARD ET AL 2,585,021
PRODUCTION OF CHIP ICE FROM SEA WATER
Filed Nov. 27, 1948 2 SHEETS—SHEET 1

INVENTOR.
James H. Lessard
BY Gerald M. Lees
ATTORNEY.

Feb. 12, 1952 J. H. LESSARD ET AL 2,585,021
PRODUCTION OF CHIP ICE FROM SEA WATER
Filed Nov. 27, 1948 2 SHEETS—SHEET 2

INVENTOR.
James H. Lessard
BY Gerald M. Lees

ATTORNEYS.

Patented Feb. 12, 1952

2,585,021

UNITED STATES PATENT OFFICE 2,585,021

PRODUCTION OF CHIP ICE FROM SEA WATER

James H. Lessard and Gerald M. Lees, Seattle, Wash.; said Lees assignor to said Lessard Application November 27, 1948, Serial No. 62,294

4 Claims. (Cl. 62—170)

This invention relates to the ice-making art, and has for its general object the provision of a machine and method of continuously freezing sea water and producing therefrom usable ice in cracked form. The invention especially adapts itself to use by fishermen as a means of producing necessary ice for maintaining a fish pack in frigid condition, and assures to the operator of a fishing vessel or, in fact, any vessel at sea a substantially unlimited source of supply from which to produce ice. Distinguished from the prevailing practice of stowing within the hold of a vessel, while in port, the quantity of ice which a vessel is presumed to require during its period at sea, and which perforce must take into account a certain loss from melting, the present invention enables the operator of the vessel to leave port without this encumbering load and to thereafter produce ice only when the need therefor arises.

Within the ice-making art, there are two general types of machine now commonly used to produce cracked ice, both of which incorporate a drum or equivalent device chilled to freezing temperature as a means of freezing upon the surface thereof a sheet of ice which is thereafter broken off in fragments. One of these machines mounts the drum for rotary movement about a horizontal axis and causes the bottom portion of the drum to dip into a basin containing a bath of continually replenished water. The replenishing water is supplied in a quantity which corresponds to the freezing capacity of the drum, and the purpose thereof is one of economy to preclude water which has been chilled to a low temperature from being dissipated as waste. The other said machine mounts the drum for rotary movement about a vertical axis and feeds a stream of water from above to cause the stream to flow downwardly over the face of the drum. In this machine, an excess of water is passed downwardly over the drum and, likewise in realization of the fact that a considerable amount of heat has been extracted from this excess water, economy in operation has demanded that the excess water be reclaimed and re-introduced into the supply line. The problem which presents itself, in creating a machine and method for freezing sea water, is that the water frozen into a sheet is largely rid of its salt content and this salt inherently is taken up by the residue liquid and raises the salinity of the latter. As the salinity increases, the temperature point necessary to accomplish freezing perforce becomes lower, and consequently a machine of the type first above-mentioned in which the residue water is retained in the bath does not adapt itself to use in the freezing of sea water. This is to say that the incoming water, if the water be sea water, continually is freed of its salt content and the dip bath thus shows a continually higher salinity reading wherefor, as the operation proceeds, lower and lower temperatures are required to freeze liquid of higher and higher salinity and the refrigeration process hence becomes so costly as to be economically impractical. On the other hand, it becomes similarly impractical, in a machine of the other type mentioned, to reclaim the excess chilled water and reintroduce the same to the supply line in that this water has likewise developed a higher salinity reading. Assuming, for example, that 50% of the sea water passes off as excess from the bottom end of the drum, the salinity would be raised from, say, a 3% normal to very nearly a 6% reading, and if then introduced to an equal quantity of incoming sea water, the salinity of the latter is raised to 4½%. Now, as one-half this volume of supplied water traverses the drum and again passes off as excess, and having again picked up additional salt from the water which is converted to ice, the salt content of the excess water then approaches 9%. The result consequently is much the same as with the dip-bath, and more and more heat units per pound of water must necessarily be extracted from the supplied water to accomplish freezing. Whereas sea water having a normal salt content of 3% commences to freeze at 27.5° F., this freezing point drops very rapidly as salinity increases, the freezing point of an 11% salt brine being, for example, 18° F.

Figure 2:
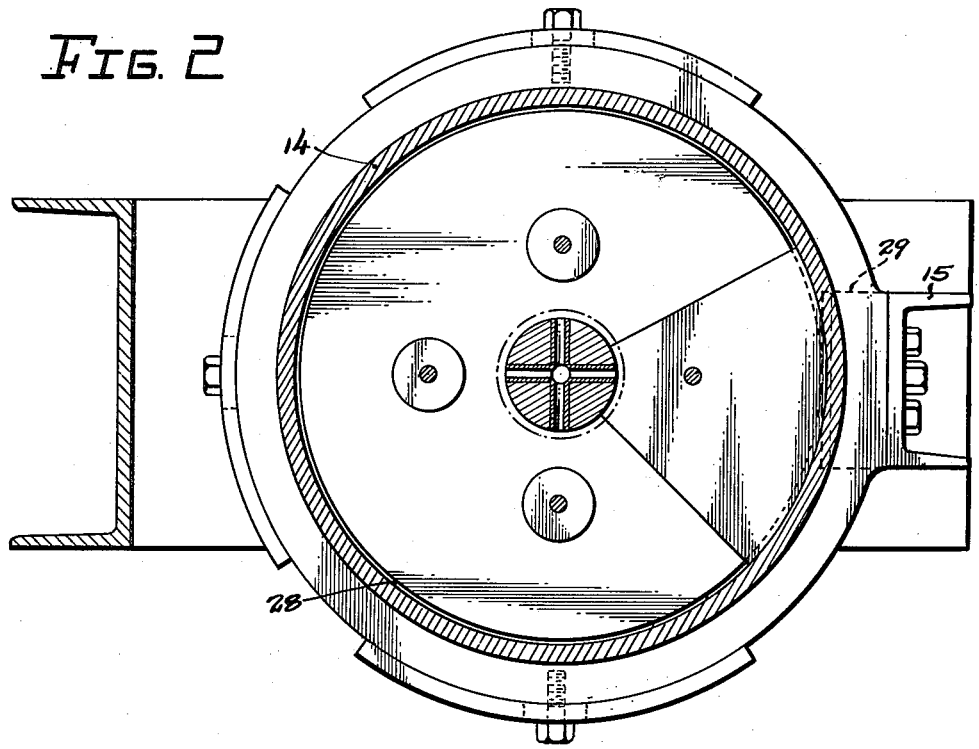
Figure 3:
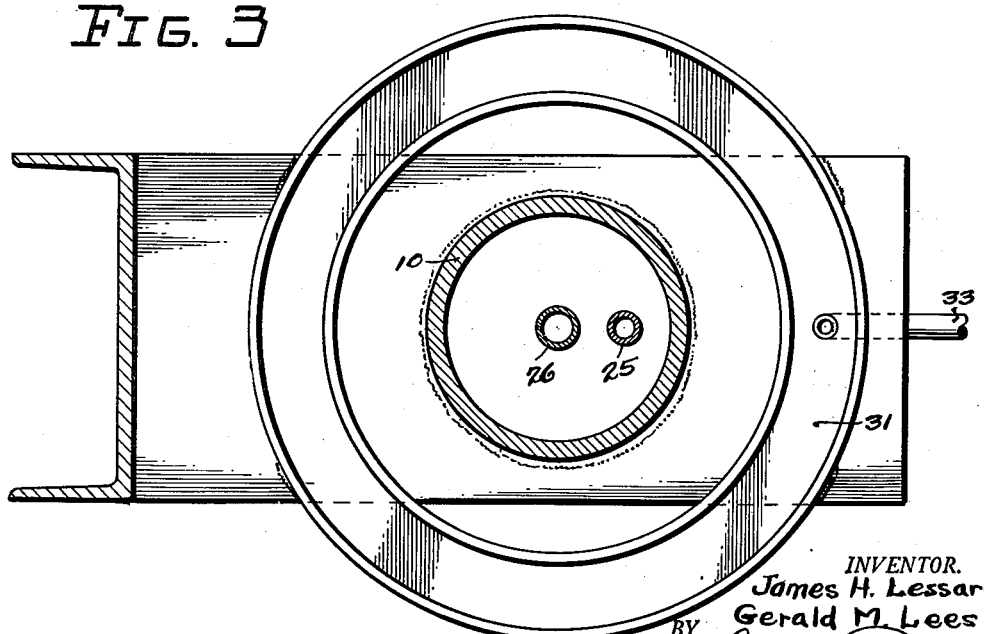

From the foregoing it will be seen that a practical process of freezing sea water precludes the water residue remaining after the freezing step from being thereafter commingled with freshly supplied sea water, and yet economy in operation demands that the energy which has been spent upon the excess water in lowering its temperature be reclaimed. Our answer to the problem is to isolate the excess water from the incoming water but at the same time put the excess chilled water to useful service by causing this excess water to draw heat units from the incoming supply of sea water, and this we accomplish by the simple instrumentality of incorporating a heat-exchange unit within the water-supply line of the system. Portrayed somewhat schematically, there is illustrated in Figure 1 of the accompanying drawings an ice-making plant produced in accordance with the teachings of the present invention. Figs. 2 and 3 are horizontal sectional views on line 2—2 and 3—3, respectively, of Fig. 1.

Insofar as the ice-making machine is concerned, we have elected to illustrate a machine of our own development on which application for Letters Patent of the United States is now pending, Ser. No. 40,646, filed July 26, 1948, and no more than a cursory description thereof is believed to be necessary in order to give a clear understanding of the manner of its working. Embodied in the machine is a hollow cylindrical drum, designated by the numeral 10. Mounted to locate its axis vertical, said drum is held stationary and becomes a part of a refrigeration circuit which includes a compressor 24. The operation is one in which water is played over the exposed surface of the drum and caused to develop a sheet of ice thereon by transfer of heat through the wall of the drum to a body of refrigerant contained within the drum. The refrigerant body, which is or may be Freon, is fed as a liquid body through a pipe 25 into the bottom end of the drum. As the liquid body picks up heat by exchange through the wall of the drum it boils off as gas and is drawn through pipe 26 to the suction side of the compressor 24. Associated with the compressor is the usual condensor, designated by 27. The water which the present invention aims to freeze is sea water, and is fed under the pressure influence of a pump 13 through a pipe 12 into a water head 14 located above the drum, this water head being rotated at a comparatively slow speed about the center of the drum as an axis and presenting a delivery throat 28 overlying an arcuate surface of the drum's perimeter. The volume and velocity of the supplied water is such as will cause the same to course downwardly as a substantially unbroken stream, developing upon the surface of the drum a solid sheet of ice having zero thickness along a perpendicular line dropped from the leading end of the delivery throat and progressively increasing in thickness circumferentially of the drum in a direction counter to the rotational movement of the water head. Employed in conjunction with said water head and drum are a set of knives 29 supported by a carrier 15 and made to rotate with the water head, and these knives act by wedge action to break the ice from the surface of the drum by cracking the same into fragments. Salient to the practical working of a machine of this character is that the supplied water must be in excess of the drum's freezing capacity, and it is the manner of handling this excess of water and taking advantage of its condition of chill to extract heat from other water which is supplied to the drum which permits us to provide an economically practical method of freezing sea water. Salient to the invention is the fact that the freed ice fragments dislodged from the drum by the cracking action of the knives are kept isolated from the excess water which traverses the drum. The excess water feeds from the lower end of the drum into an annular gutter 30 and funnels therefrom into a basin 31. The ice fragments are separated from such excess water by a baffle 32 which diverts the ice by preference into an annular collecting trough (not shown) surrounding the basin 31. The ice received in the trough is or may be removed by a blade which rotates in concert with the knives and pushes the collected ice to a side-wall opening through which it is discharged into a subjacent bin or the like (not shown).

According to our method of freezing sea water, the excess water is picked up from the basin 31 by a pump 18 and fed by a pipe 33 to a heat-exchange unit which we illustrate as comprising a coil 20 housed within a closed tank 21, the said excess of chilled water passing through the coil and thence passing off as waste from a discharge pipe 22. The fresh supply of sea water is at the same time drawn into the top of the tank through a pipe 23 and, working downwardly therein, transfers contained heat units to the excess water passing through the coil. Said tank water being thus chilled in course of its down travel through the tank is picked up and carried by a pipe 11 to the pump 13 and thence through pipe 12 to the water head. It has been our finding that we can recapture very nearly all of the condition of chill which has been given to the excess water traversing the refrigerated drum, and that in consequence thereof we can economically freeze sea water at a cost very little higher than is required for the freezing of fresh water. The plant itself, comprising the drum, the heat-exchange unit, a compressor for the refrigerant, and necessary pumps, may be installed at comparatively little cost and occupies only a minor amount of space on the vessel.

It is thought that the invention will have been clearly understood from the foregoing. Other than for the fact that the ice-making machine must be of such a character as to enable the residue of sea water from which a portion has been frozen to be thereafter isolated from direct intermingling with freshly supplied sea water, the nature of the ice-making machine is unimportant to the invention nor is it of any essential moment what type of heat-exchange unit is employed to accomplish a transfer of heat units from the freshly supplied to the used sea water which has been previously chilled through heat-exchange association with the refrigerant.

Throughout the foregoing description, the water which is to be frozen has been referred to as sea water but it is here pointed out that the machine and process of the present invention is also of distinct advantage as applied to the freezing of fresh water. This is by reason of the fact that in fresh as well as sea water, unless the fresh water be distilled, there are contained certain salts which normally remain in solution but which precipitate out as the concentration rises. Calcium bicarbonate and calcium carbonate as well as silica salts are, in greater or lesser amounts, generally to be found in practically all fresh water, and while the contained quantity is normally so small as to have little if any immediate effect upon the freezing drum of an ice-making machine, continued freezing of fresh water in a process which commingles an augmenting supply with waters previously used and from which a portion has been extracted by freezing ultimately causes the contained salts to approach a point of saturation at which precipitation takes place. The precipitated salts commonly deposit themselves upon the chilled surface of the quick-freeze drum and produce thereon a hard and resistant cake which requires considerable time and effort to remove, emery cloth being generally used for the purpose. The salt caking is encountered in each of the two types of prior chip-ice machines herein referred to but is the more pronounced with the "bath" type of machine, and which is to say that character of machine which causes its quick-freeze drum to dip into a bath of water. Even when initially appearing in the form of pinpoint deposits, the salt precipitated presents a problem in that it causes the formed ice to stick upon the drum and it has been the experience of most operators using existing chip-ice machines that frequent servicing is necessary to rid the drum of the deposited salt. The "bath" type of machine is, in fact, serviced for this purpose at regular monthly intervals.

It is our intention that the hereto annexed claims be given a scope fully commensurate with the broadest interpretation which the employed language fairly permits.

What we claim is:

1. A continuous-operation method of producing cracked ice from sea water which comprises the steps of continually flowing a stream of freshly supplied sea water over a rigid heat-exchange surface of cylindrical contour with the direction of flow being parallel to the cylinder's axis and such as to have the water stream curtain less than the latter's full circumferential extent, the curtain being sectionally of a shape approximating a partial-circle arc of the cylindrical surface, causing the curtain of supplied water to progress bodily in a direction circumferentially of the heat-exchange surface while coincidently chilling said surface to a quick-freeze temperature, continuously freeing from the heat-exchange surface that part of the produced ice sheet which is not curtained by the supplied sea water through the instrumentality of breaking this portion of the ice sheet into fragments, the volume of sea water supplied to said heat-exchange surface being in excess of the latter's freezing capacity, separating from the freed ice the chilled excess of water which leaves the heat-exchange surface, keeping this separated excess completely isolated from the freed ice, from the heat-exchange surface, and from the freshly supplied sea water, and by exchange of heat transferring to this trapped excess of chilled water heat units contained within the sea water being freshly supplied, thereby to recapture energy expended in chilling the excess.

2. The method of claim 1 in which the exchange of heat from the freshly supplied sea water to the separated excess is accomplished as both bodies constantly move in converse directions along separated paths of progressive travel.

3. Given a solution in which the freezing point of the contained solvent is higher than that of the solution, the continuous-operation method of removing solvent from said solution, and which comprises the steps of continually flowing a freshly supplied stream of the solution over a rigid heat-exchange surface of cylindrical contour with the direction of flow being parallel to the cylinder's axis and such as to have the stream curtain less than the cylinder's full circumferential extent, the curtain of supplied solution being sectionally of a shape approximating a partial-circle arc of the cylindrical surface, causing the curtain of supplied solution to progress bodily in a direction circumferentially of the heat-exchange surface while coincidently chilling said surface to a quick-freeze temperature sufficiently low to cause the solvent to resolve itself from the solution and collect as a coating of ice upon said surface, continuously freeing produced ice from that part of the heat-exchange surface which is not curtained by the supplied solution, the volume of supplied solution being in excess of the freezing capacity of the heat-exchange surface, separating from the freed ice the chilled excess of supplied solution which leaves the heat-exchange surface, keeping this separated excess completely isolated from the freed ice, from the heat-exchange surface, and from the freshly supplied solution, and by exchange of heat transferring to this separated excess of chilled solution heat units contained within the solution being freshly supplied, thereby to recapture energy expended in chilling the excess.

4. Given a liquid composition in which one of the components has a freezing point higher than the freezing point of the composition, the continuous-operation method of removing said high freezing point component from said solution, and which comprises the steps of continually flowing a freshly supplied stream of the liquid composition over a rigid heat-exchange surface of cylindrical contour with the direction of flow being parallel to the cylinder's axis and such as to have the stream curtain less than the cylinder's full circumferential extent, the curtain of supplied solution being sectionally of a shape approximating a partial-circle arc of the cylindrical surface, causing the curtain of supplied liquid to progress bodily in a direction circumferentially of the heat-exchange surface while coincidently chilling said surface to a quick-freeze temperature sufficiently low to cause the high frequency point component to resolve itself from the liquid composition and collect as a coating of ice upon said surface, continuously freeing produced ice from that part of the heat-exchange surface which is not curtained by the supplied liquid, the volume of supplied liquid being in excess of the freezing capacity of the heat-exchange surface, separating from the freed ice the chilled excess of supplied liquid which leaves the heat-exchange surface, keeping this separated excess completely isolated from the freed ice, from the heat-exchange surface, and from the freshly supplied liquid composition, and by exchange of heat transferring to this separated excess of chilled liquid heat units contained within the liquid composition being freshly supplied, thereby to recapture energy expended in chilling the excess.

JAMES H. LESSARD.
GERALD M. LEES.

REFERENCES CITED

The following references are of record in the file of this patent:

UNITED STATES PATENTS

| Number | Name | Date |
|---|---|---|
| 1,931,347 | Gay | Oct. 17, 1933 |
| 1,963,842 | Gay | June 19, 1934 |
| 2,066,431 | Taylor | Jan. 5, 1937 |
| 2,310,468 | Short | Feb. 9, 1943 |

FOREIGN PATENTS

| Number | Country | Date |
|---|---|---|
| 387,460 | France | July 10, 1908 |